United States Patent
Lee et al.

(10) Patent No.: US 9,893,848 B2
(45) Date of Patent: Feb. 13, 2018

(54) MOBILE COMMUNICATION SYSTEM FOR PROVIDING CARRIER AGGREGATION BETWEEN DIGITAL UNITS, AND METHOD FOR PROCESSING SIGNAL IN THE SAME

(71) Applicant: KT CORPORATION, Gyeonggi-do (KR)

(72) Inventors: Ki-Ho Lee, Gyeonggi-do (KR); Yong-Gyoo Lee, Seoul (KR); Yung-Ha Ji, Gyeonggi-do (KR)

(73) Assignee: KT CORPORATION, Gyeonggi-do (KR)

( * ) Notice: Subject to any disclaimer, the term of this patent is extended or adjusted under 35 U.S.C. 154(b) by 132 days.

(21) Appl. No.: 14/440,259

(22) PCT Filed: Sep. 2, 2013

(86) PCT No.: PCT/KR2013/007912
§ 371 (c)(1),
(2) Date: May 1, 2015

(87) PCT Pub. No.: WO2014/069780
PCT Pub. Date: May 8, 2014

(65) Prior Publication Data
US 2015/0305036 A1    Oct. 22, 2015

(30) Foreign Application Priority Data

Nov. 1, 2012 (KR) .................. 10-2012-0123226

(51) Int. Cl.
*H04W 4/00* (2009.01)
*H04L 5/00* (2006.01)
(52) U.S. Cl.
CPC ..................... *H04L 5/001* (2013.01)
(58) Field of Classification Search
None
See application file for complete search history.

(56) References Cited

U.S. PATENT DOCUMENTS 8,514,800 B2    8/2013  Kim et al.
2011/0275359 A1*  11/2011  Sebire ............... H04L 5/001
                                                        455/422.1

(Continued)

FOREIGN PATENT DOCUMENTS

EP    2456260 A2    5/2012
JP    2002-280954 A  9/2002

(Continued)

*Primary Examiner* — Chi H Pham
*Assistant Examiner* — Fahmida Chowdhury
(74) *Attorney, Agent, or Firm* — IP Legal Services, LLC

(57) ABSTRACT

A mobile communication system for providing carrier aggregation between digital units, and a method for processing a signal in the system are provided.

The mobile communication system includes: a plurality of digital units connected to a core system and configured to process a radio digital signal; a blade server connected to at least two or more digital units and configured to perform resource allocation on signals processed by the connected digital units; and a plurality of radio units physically separated from the digital units, configured to convert and amplify digital signals received from the digital units, and transmit the same to a terminal, and configured to receive a signal transmitted from the terminal and transmit the received signal to the digital units. In the system, a mobile communication service is provided to the terminal by using carrier aggregation between radio units respectively connected to at least two or more digital units and using different frequencies.

16 Claims, 6 Drawing Sheets

(56) References Cited

U.S. PATENT DOCUMENTS

| | | | |
|---|---|---|---|
| 2011/0294508 A1 | 12/2011 | Min et al. | |
| 2011/0305220 A1 | 12/2011 | Lindoff et al. | |
| 2012/0113839 A1* | 5/2012 | Etemad | H04B 7/024 |
| | | | 370/252 |
| 2012/0287911 A1* | 11/2012 | Takano | H04W 36/0088 |
| | | | 370/332 |
| 2013/0017823 A1 | 1/2013 | Mao et al. | |
| 2013/0136068 A1* | 5/2013 | Johansson | H04W 88/085 |
| | | | 370/329 |
| 2013/0244656 A1* | 9/2013 | Heo | H04W 72/0413 |
| | | | 455/436 |
| 2013/0286952 A1* | 10/2013 | Ghosh | H04L 5/0007 |
| | | | 370/329 |

FOREIGN PATENT DOCUMENTS

| | | |
|---|---|---|
| KR | 10-2005-0014530 A | 2/2005 |
| KR | 10-2007-0068637 A | 7/2007 |
| KR | 10-2011-0087949 A | 8/2011 |
| KR | 10-2011-0130782 A | 12/2011 |

\* cited by examiner

MOBILE COMMUNICATION SYSTEM FOR PROVIDING CARRIER AGGREGATION BETWEEN DIGITAL UNITS, AND METHOD FOR PROCESSING SIGNAL IN THE SAME

CROSS REFERENCE TO RELATED APPLICATIONS

This application is a National Stage Patent Application of PCT International Patent Application No. PCT/KR2013/007912 (filed on Sep. 2, 2013) under 35 U.S.C. § 371, which claims priority to Korean Patent Application No. 10-2012-0123226 (filed on Nov. 1, 2012), the teachings of which are incorporated herein in their entireties by reference.

BACKGROUND OF THE INVENTION (a) Field of the Invention

The present disclosure relates to a mobile communication system for providing carrier aggregation between digital units, and a method for processing a signal in the system.

(b) Description of the Related Art

In general, in a communication base station, a digital signal processing unit (hereinafter, referred to as a "digital unit (DU)") and a radio signal processing unit (hereinafter, referred to as a "radio unit (RU)") are included in a single physical system. However, in such a system, a base station including all of processing units should be installed in a cell, thereby having a limitation in optimization of designing a cell. Thus it is difficult to improve radio capacity. In order to solve the problem, only an antenna component and an RF component processing a radio signal are remotely separated to form a radio unit (RU), and a plurality of RUs are connected to a single digital unit (DU).

Recently, radio communication technologies have rapidly advanced, and communication system technologies have also rapidly evolved. Among them, a long term evolution (LTE) system has come to prominence as a $4^{th}$-generation mobile communication technology. In the LTE system, various technologies, including carrier aggregation (CA), have been introduced to meet exploding traffic demand. CA is a technique of using a primary carrier and one or a plurality of secondary carriers, rather than using only a single carrier between a terminal and a base station in a typical communication system, whereby a transmission amount may significantly increase to correspond to the number of secondary carriers.

For example, CA is available between different frequencies by connecting a plurality of RUs having different center frequencies to a single DU.

However, CA is possible only for RUs connected to the same DU and supporting different frequencies. That is, CA is not possible between RUs connected to different DUs and supporting different frequencies.

The above information disclosed in this Background section is only for enhancement of understanding of the background of the invention and therefore it may contain information that does not form the prior art that is already known in this country to a person of ordinary skill in the art.

SUMMARY OF THE INVENTION

Embodiments of the present disclosure have been made in an effort to provide a mobile communication system allowing for carrier aggregation (CV) between radio units (RUs) connected to different digital units (DUs) and using different frequencies, and a signal processing method in the system.

An exemplary embodiment of the present disclosure provides a mobile communication system using carrier aggregation, including: a plurality of digital units connected to a core system and configured to process a radio digital signal; a blade server connected to at least two or more digital units and configured to perform resource allocation on signals processed by the connected digital units; and a plurality of radio units physically separated from the digital units, configured to convert and amplify digital signals received from the digital units and transmit the same to a terminal, receive a signal transmitted from the terminal, and transmit the received signal to the digital units, wherein a mobile communication service is provided to the terminal by using carrier aggregation between radio units respectively connected to at least two or more digital units and using different frequencies.

The two or more digital units may use protocols including radio resource control (RRC), a packet data convergence protocol (PDCP), and a physical (PHY). The blade server may use radio link control (RLC) and medium access control (MAC) protocols.

A digital unit operating as a primary component carrier (PCC) with respect to a particular user, among the two or more digital units, may perform signal processing using the RRC, PDCP, and PHY protocols. A digital unit operating as a secondary component carrier (SCC) with respect to the particular user, among the two or more digital units, may perform signal processing using the PHY protocol.

When an uplink signal is received, the digital unit operating as a PCC and the digital unit operating as an SCC may apply the PHY protocol and transmit the received PHY data to the blade server, respectively, and signals processed by the blade server by using the MAC and RLC protocols may be transmitted to the digital unit operating as a PCC, processed by using the PDCP and RRC protocols, and subsequently transmitted to the core system.

The digital unit operating as a PCC may receive data transmitted from the core system, process the received data by using the RRC and PDCP protocols, and subsequently transmit the processed signal to the blade server, and resource allocation-processed signals by the blade server by using the MAC and RLC protocols may be transmitted to the digital unit operating as the PCC and the digital unit operating as an SCC, respectively, according to frequencies.

Another embodiment of the present disclosure provides a mobile communication system using carrier aggregation, including: a first digital unit connected to a core system and configured to operate as a primary component carrier (PCC) with respect to a particular user; a second digital unit connected to the core system and configured to operate as a secondary component carrier (SCC) with respect to the particular user; a blade server connected to the first and second digital units and configured to perform resource allocation on signals processed by the first and second digital units; a first radio unit connected to the first digital unit and configured to convert and amplify a digital signal received from the first digital unit and transmit the same to a terminal through a first frequency, receive a signal transmitted from the terminal through the first frequency, and transmit the received signal to the first digital unit; and a second radio unit connected to the second digital unit and configured to convert and amplify a digital signal received from the second digital unit and transmit the same to a terminal through a second frequency different from the first frequency, receive a signal transmitted from the terminal through the second frequency, and transmit the received signal to the second digital unit; wherein a mobile communication service is provided to the terminal by using carrier aggregation using the first and second frequencies between the first and second radio units respectively connected to the first and second digital units.

The first digital unit may perform signal processing for the particular user by using protocols including a radio resource control (RRC), a packet data convergence protocol (PDCP), and a physical (PHY), and the second digital unit may perform signal processing for the particular user by using the PHY protocol. The blade server may perform resource allocation when processing a signal by using the RLC and MAC protocols.

Yet another embodiment of the present disclosure provides a signal processing method for providing a mobile communication service with respect to a terminal by using carrier aggregation by a mobile communication system, including: receiving, by the first digital unit, data to be transmitted to a terminal of the particular user from the core system, and transmitting the received data to the blade server; allocating, by the blade server, resources with respect to the first frequency and the second frequency by using the data; transmitting, by the blade server, resource information allocated to the first frequency and the data to the first digital unit, and transmitting resource information allocated to the second frequency and the data to the second digital unit; and transmitting, by the first digital unit and the second digital unit, the data to terminal of the particular user by using the resource information transmitted from the blade server.

In the transmitting to the blade server, the first digital unit may perform signal processing on the data received from the core system by using protocols including the RRC and the PDCP, and transmit the same to the blade server.

In the allocating of resources, the blade server may perform resource allocation corresponding to the first and second frequencies by using the RLC and MAC protocols with respect to the data transmitted from the first digital unit.

In the transmitting to the terminal of the particular user, the first and second digital units may perform signal processing on the data to be transmitted to the terminal of the particular user by using the PHY protocol thereof.

Still another embodiment of the present disclosure provides a signal processing method for providing a mobile communication service with respect to a terminal by using carrier aggregation by a mobile communication system, including: receiving, by the first and second radio units, a signal from the terminal of the particular unit, and transmitting the received signal to the blade server; combining, by the blade server, signals transmitted from the first and second radio units by using resource information allocated to the first and second frequencies, and transmitting the same to the first digital unit; and performing, by the first digital unit, signal processing for packet aggregation and radio resource controlling on data transmitted from the blade server, and transmitting the same to the core system.

In the transmitting to the blade server, the first and second digital units may receive the signal transmitted from the terminal of the particular user as PHY data by using the PHY protocol thereof, and transmit the PHY data to the blade server.

In the transmitting to the first digital unit, the blade server may combine the PHY data transmitted from the first and second digital units by using resource allocation information corresponding to the first and second frequencies and the RLC and MAC protocols and transmit the same to the first digital unit.

In the transmitting to the core system, the first digital unit may perform signal processing on the data received from the blade server by using protocols including the RRC and the PDCP, and transmit the same to the core system.

According to an exemplary embodiment of the present invention, carrier aggregation may be performed between RUs connected to different DUs and using different frequencies.

Thus, since carrier aggregation is performed between boundary cells belonging to different DUs, a range supporting carrier aggregation may resultantly expand.

DETAILED DESCRIPTION OF THE EMBODIMENTS

Figure 1:
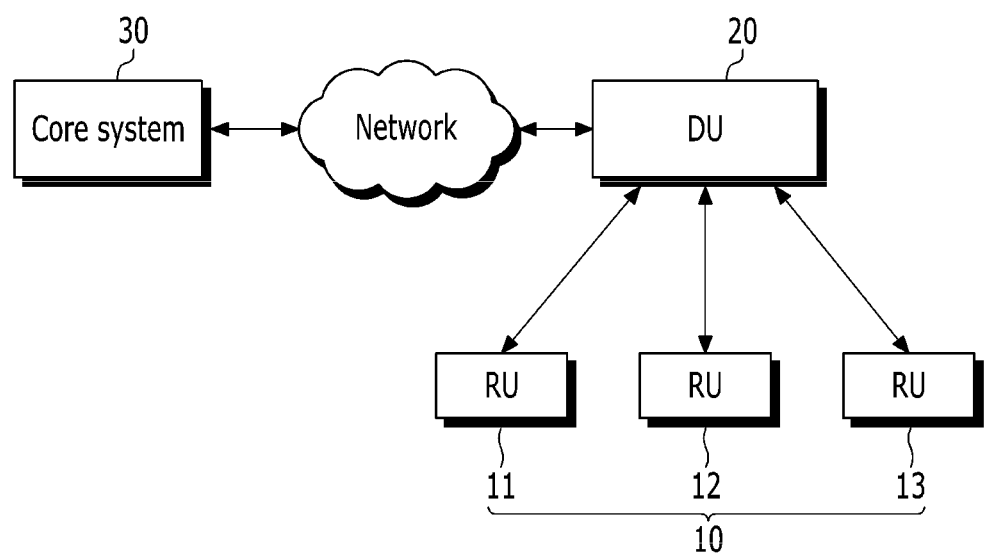
FIG. 1 is a schematic block diagram of a network according to an exemplary embodiment of the present disclosure.

In the following detailed description, only certain exemplary embodiments of the present disclosure have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and operation, and can be implemented by hardware components or software components and combinations thereof.

Throughout the specification, a terminal may refer to a mobile station (MS), a mobile terminal (MT), a subscriber station (SS), a portable subscriber station (PSS), user equipment (UE), and an access terminal (AT), and may include the entirety or a portion of functions of a terminal, an MT, an SS, a PSS, a UE, an AT, and the like.

Also, a base station (BS) may refer to an access point (AP), a radio access station (RAS), a node B, an evolved node B (eNodeB), a base transceiver station (BTS), a mobile multihop relay (MMR)-BS, or the like, and may include the entirety or a portion of functions of an AP, an RAS, a node B, an eNodeB, a BTS, an MMR-BS, and the like.

First, a network architecture to which an embodiment of the present invention is applied will be described.

FIG. 1 is a schematic block diagram of a network according to an exemplary embodiment of the present disclosure.

Referring to FIG. 1, a network according to according to an exemplary embodiment of the present disclosure includes a radio unit (RU) 10, a digital unit (DU) 20, and a core system 30. The RU 10 and the DU 20 constitute a signal processing system.

The RU 10 is a part for processing a radio signal. The RU 10 converts a digital signal received from the DU into a radio frequency (RF) signal according to a frequency band, and amplifies the same. The RU 10 transmits the amplified signal to a terminal through an antenna. The UR 10 receives a signal from a terminal through an antenna, processes the received signal, and transmits the processed signal to the DU 10.

A plurality of RUs 11, 12, and 13 are connected to the DU 20, and each RU is installed in a service target area, namely, a cell. The RU 10 and the DU 20 may be connected by an optical cable.

The DU 20 encrypts or decrypts a digital radio signal, and is connected to the core system 30. Unlike the RU 10, the DU 20 is a server largely concentratedly installed in a local telecommunication office, rather than being installed in the service target area. That is, the DU 20 is a virtualized base station. The DU 20 transmits and receives signals to and from the plurality of RUs 10.

A typical communication base station includes processing units corresponding to the RU 10 and the DU 20, and a single physical system is installed in a service target area. In contrast, in accordance with an exemplary embodiment of the present disclosure, the RU 10 is physically separated from the DU 20, and the RU 10 is installed only in a service target area.

The core system 30 processes connection between the DU 20 and an external network, and includes a switching system (not shown).

Figure 2:
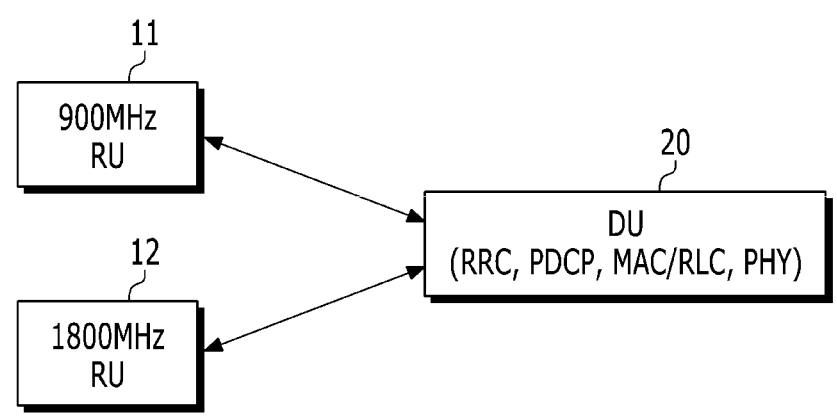
FIG. 2 is a view illustrating a general example using a carrier aggregation (CA) technique.

FIG. 2 is a view illustrating a general example using a carrier aggregation (CA) technique.

Referring to FIG. 2, two RUs 11 and 12 are connected to one DU 20. The RU 11 uses a center frequency of 900 MHz and the RU 12 uses a center frequency of 1800 MHz.

By connecting the two RUs 11 and 12 having different center frequencies to the single DU 20, CA may be performed between the 900 MHz and 1800 MHz frequencies.

Here, the DU 20 includes, as radio protocols, a radio resource control (RRC), a packet data convergence protocol (PDCP), a radio link control (RLC), a medium access control (MAC), and a physical (PHY).

The PHY, a first layer, serves to transmit data to a wireless section using various wireless transfer technologies. The PHY is connected to the MAC, a higher layer, through a transport channel for reliable data transmission of the wireless section, and the transport channel is divided into a dedicated transport channel and a common transport channel depending on whether the transport channel is shared.

The second layer includes a MAC, an RLC, and a PDCP.

The MAC serves to map various logical channels to various transport channels, and also serves to perform logical channel multiplexing to map several logical channels to a single transport channel. The MAC is connected to an RLC, a higher layer, through a logical channel, and the logical channel is divided into a control channel transmitting information of a control plane and a traffic channel transmitting information of a user plane, depending on a type of transmitted information.

The RLC serves to guarantee quality of service of each radio bearer (RB) and handle transmission of data. In order to guarantee QoS unique to each RB, the RLC has one or two independent RLC entities in each RB, and in order to support a variety of QoS, the RLC provides three RLC modes, i.e., a transparent mode (TM), an unacknowledged mode (UM), and an acknowledged mode (AM). Also, in order to allow a lower layer to be appropriate for transmitting data to a wireless section, the RLC serves to adjust a size of data, and to this end, the RLC performs a function of data segmentation and concatenation.

The PDCP is positioned above the RLC and allows data transmitted using an IP packet such as IPv4 or IPv6 to be effectively transmitted in a wireless section having a relatively small bandwidth. To this end, the PDCP serves to perform a header compression function. The header compression function is used to transmit only information requisite for a header part of data to thus increase transmission efficiency of a wireless section. A basic function of the PDCP is header compression. Thus, the PDCP exists only in a packet switched (PS) domain. In order to provide an effective header compression function for each PS service, one PDCP entity per RB exists.

The RRC positioned in the lowermost portion of the third layer is defined only in the control plane. The RRC serves to control parameters of first and second layers in association with configuration, reconfiguration, and release of radio bearers (RBs), and to also control a logical channel, a transport channel, and a physical channel. Here, an RB refers to a logical path provided by the first and second layers of the radio protocols to transmit data between a terminal and a base station. In general, the setup of the RB implies a process for defining a radio protocol layer and channel properties required for providing a particular service and for determining specific parameters and operations. In particular, the MAC and the RLC serves to allocate resources for data transmission.

The radio protocols of RRC, PDCP, RLC, MAC, and PHY are well known, and thus descriptions of details thereof will be omitted.

The DU 20 illustrated in FIG. 2 includes all of the radio protocols RRC, PDCP, RLC, MAC, and PHY. The DU 20 may provide a carrier aggregation function using the two RUs 11 and 12 through such radio protocols.

However, in the technique described above with reference to FIG. 2, the MAC and the RLC allocating radio resource allow carrier aggregation (CA) to be performed only between the RUs 11 and 12 connected to the corresponding DU 20 and supporting different frequencies within the single DU 20. That is, the MAC and the RLC cannot provide the CA function between RUs connected to different DUs.

Hereinafter, a mobile communication system providing CA between different digital units according to an exemplary embodiment of the present disclosure, solving the foregoing problem, will be described.

Figure 3:
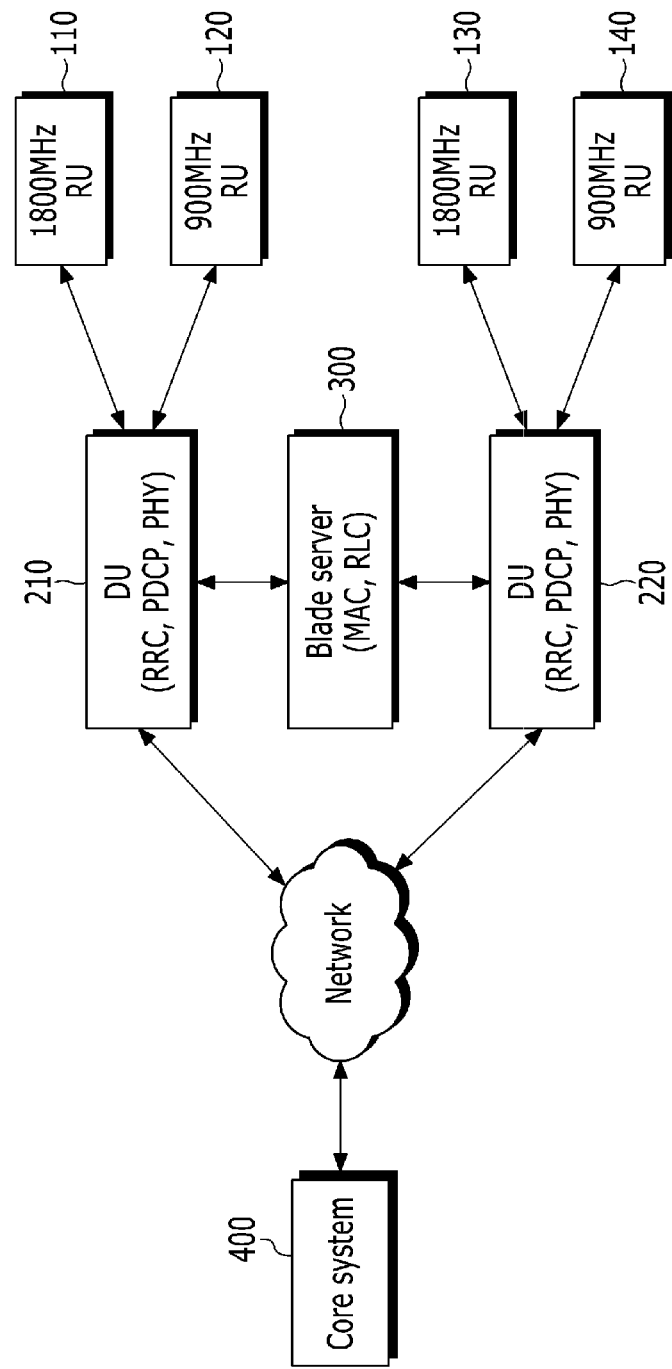
FIG. 3 is a view schematically illustrating a mobile communication system according to an exemplary embodiment of the present disclosure.

FIG. 3 is a view schematically illustrating a mobile communication system according to an exemplary embodiment of the present invention.

As illustrated in FIG. 3, in the mobile communication system according to an exemplary embodiment of the present disclosure, two RUs 110 and 120 and two RUs 130 and 140 are connected to different DUs 210 and 220, respectively. Here, the RUs 110 and 130 provide a mobile communication service using an 1800 MHz frequency, and the RUs 120 and 140 provide a mobile communication service using a 900 MHz frequency. The configuration of the DUs 210 and 220 and the RUs 110, 120, 130, and 140 is not limited to the foregoing example, and any configuration may be used as long as a plurality of RUs are connected to different DUs and different frequencies are used.

The DUs 210 and 220 according to an exemplary embodiment of the present disclosure include only the RRC, PDCP, and PHY as radio protocols, unlike the typical DU 20 described above with reference to FIGS. 1 and 2.

A blade server 300 connected to the DUs 210 and 220 include the MAC and the RLC as radio protocols. That is, resource allocation with respect to data processed in the DUs 210 and 220 is performed by the blade server 300.

In the structure illustrated in FIG. 3, the CA technique may be applied between the RUs 110 and 120 connected to the DU 210 and between the RUs 130 and 140 connected to the DU 220, like the related art.

Also, in an exemplary embodiment of the present disclosure, only the MAC and RLC functions for allocating resource are separated to be included in the blade server 300 and commonly used between the DUs 210 and 220, and each of the DUs 210 and 220 is allowed to process only the other protocols such as the RRC, PDCP, and PHY, whereby the CA technique is applied between the RUs 110 and 140 and the RUs 120 and 130 connected to different DUs 210 and 220. Here, the MAC and RLC entities of the blade server appropriately allocate resources to both frequencies of the different RUs 110 and 140 and the RUs 120 and 130.

Meanwhile, an individual unit carrier grouped by CA is called a component carrier (CC), and the CA, supporting a plurality of CCs, is also called bandwidth aggregation. Here, each CC is defined by a bandwidth and a center frequency, and CCs may be divided into a primary CC (PCC) and a secondary CC (SCC). The PCC is a carrier activated all the time, and the SCC is a carrier activated or deactivated according to particular conditions. Activation refers to a state in which data transmission or reception is performed or a standby state. Deactivation refers to a state in which it is not possible to transmit or receive traffic data and it is only possible to perform measurement or transmit and receive minimal information. A user terminal may use only a single PCC or may use one PCC and one or more SCCs. Here, the user may be allocated a PCC and/or an SCC from the DUs 210 and 220 with respect to the terminal.

Hereinafter, a method for providing CA between different DUs 210 and 220 in a mobile communication system according to an exemplary embodiment of the present disclosure is described.

Figure 4:
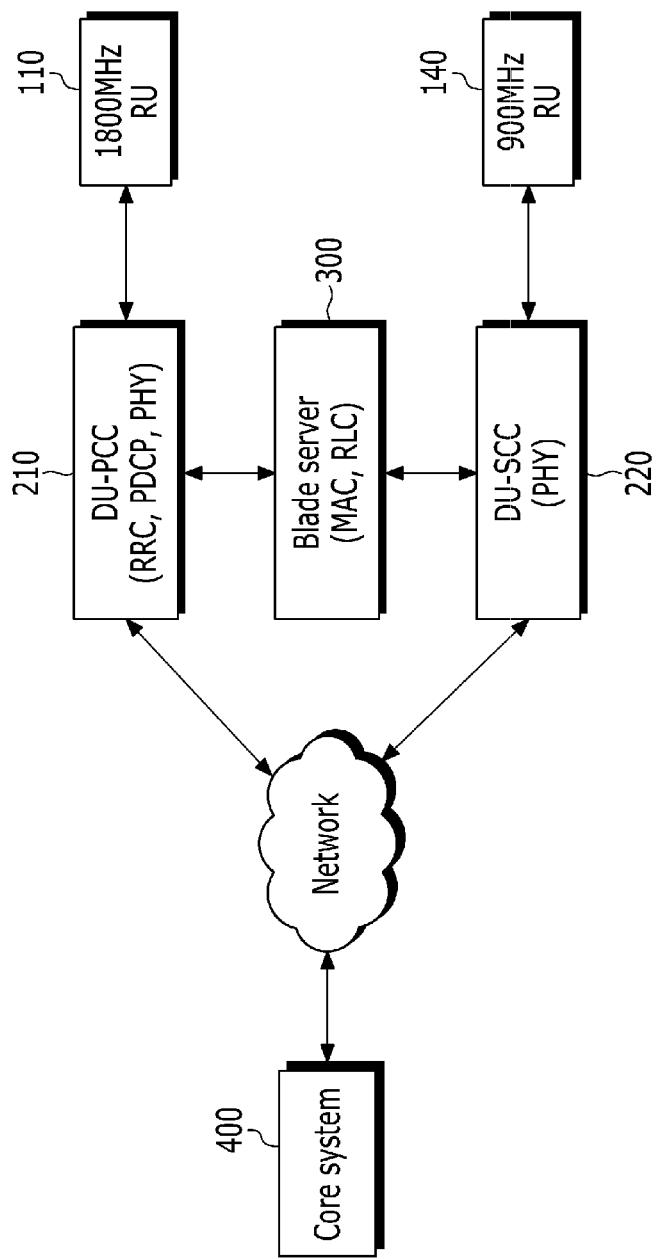
FIG. 4 is a view illustrating a mobile communication system including one digital unit (DU) operating as a primary carrier component (PCC) and the other DU operating as a secondary carrier component (SCC) with respect to a user A according to an exemplary embodiment of the present disclosure.

With reference to FIG. 4, the method will be described with assumption that a mobile communication system includes the DU 210 operating as a PCC and the DU 220 operating as an SCC with respect to a user A.

Referring to FIG. 4, since the DU 210 operates as a PCC, the DU 210 processes all the protocols RRC, PDCP, and PHY when processing a signal with respect to the user A. Since the DU 220 operates as an SCC, the DU 220 serves only as a PHY when processing a signal with respect to the user A.

In detail, in case of uplink, a signal transmitted from the terminal is received through the RU 140 at 900 MHz and the RU 110 at 1800 MHz and converted into PHY data, and the PHY data is delivered to the blade server 300 through the RUs 110 and 140.

The blade server 300 performs MAC and RLC processing on the PHY data transmitted from the RUs 110 and 140, and the blade server 300 transmits the same to the DU 210 as a PCC. Here, the blade server 300 performs MAC and RLC processing using resources allocated to the RUs 110 and 140.

After the DU 210 as a PCC completes signal processing using the protocols such as the PDCP and the RRC therein, the DU 210 transmits the same to a core system 400 through a network.

In this manner, the signal transmitted from the terminal through the CA technique may be received by the RUs 110 and 140 connected to the two different DUs 210 and 220 and transmitted to the core system 400 in the upper stage.

Meanwhile, in case of downlink, when data transmitted from the core system 400 to the terminal is received by the DU 210 as a PCC, the DU 210 performs signal processing using the protocols RRC and PDCP with respect to the corresponding data, and transmits the same to the blade server 300 serving to allocate resources.

The blade server 300 allocates resources by performing common MAC and RLC processing for appropriately allocating resource to 900 MHz and 1800 MHz frequencies with respect to the data transmitted from the DU 210. The blade serer 300 transmits corresponding data to each of the DUs 210 and 220.

In order to transmit the data transmitted from the blade server 300 by using the resources allocated from the blade server 300, the DUs 210 and 220 convert the data into a corresponding signal by using the PHY function thereof and subsequently deliver the same to each of the RUs 110 and 140 such that the converted signal can be transmitted to the terminal.

Hereinafter, with reference to FIG. 5, the method will be described with assumption that a mobile communication system includes the DU 220 operating as a PCC and the DU 210 operating as an SCC with respect to a user B.

Figure 5:
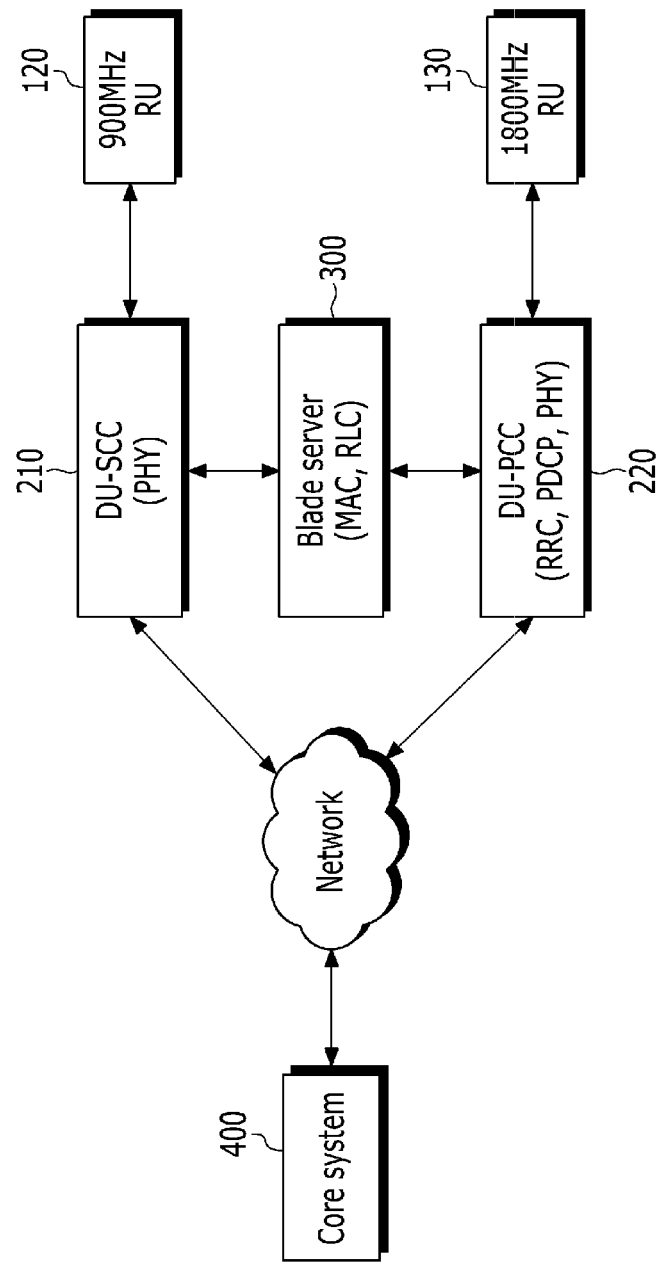
FIG. 5 is a view illustrating a mobile communication including one digital unit (DU) operating as a primary carrier component (PCC) and the other DU operating as a secondary carrier component (SCC) with respect to a user B according to an exemplary embodiment of the present disclosure.

Referring to FIG. 5, since the DU 220 operates as a PCC, the DU 220 processes all the protocols RRC, PDCP, and PHY when processing a signal with respect to the user A. Since the DU 210 operates as an SCC, the DU 210 serves only as a PHY when processing a signal with respect to the user B.

In detail, in case of uplink, a signal transmitted from the terminal is received through the RU 120 at 900 MHz and the RU 130 at 1800 MHz and converted into PHY data, and the PHY data is delivered to the blade server 300 through the RUs 120 and 130.

The blade server 300 performs MAC and RLC processing on the PHY data transmitted from the RUs 120 and 130. The blade server 300 transmits the same to the DU 220 as a PCC.

After the DU 220 as a PCC completes signal processing using the protocols such as the PDCP and the RRC therein, the DU 220 transmits the same to the core system 400 through a network.

In this manner, the signal transmitted from the terminal through the CA technique may be received by the RUs 120 and 130 connected to the two different DUs 210 and 220 and transmitted to the core system 400 in the upper stage.

Meanwhile, in case of downlink, when data transmitted from the core system 400 to the terminal is received by the DU 220 as a PCC, the DU 220 performs signal processing using the protocols RRC and PDCP with respect to the corresponding data, and the DU 220 transmits the same to the blade server 300 serving to allocate resources.

The blade server 300 allocates resources by performing common MAC and RLC processing for appropriately allocating resources to 900 MHz and 1800 MHz frequencies with respect to the data transmitted from the DU 220. The blade server 300 transmits corresponding data to each of the DUs 210 and 220. Here, the blade server 300 transmits resource information allocated by frequency and corresponding data to each of the DUs 210 and 220.

In order to transmit the data transmitted from the blade server 300 by using the resource allocated from the blade server 300, the DUs 210 and 220 convert the data into a corresponding signal by using the PHY function thereof and subsequently deliver the same to each of the RUs 120 and 130 such that the converted signal can be transmitted to the terminal.

In this manner, in an exemplary embodiment of the present disclosure, by allowing the DUs to commonly use the MAC and RLC functions of performing a resource allocation, CA may be performed between the RUs connected to different DUs and using different frequencies.

Thus, since CA may be performed between the RUs connected to different DUs, the CA available range, which has been limited only to RUs connected to the existing DU, may be widened.

Figure 6:
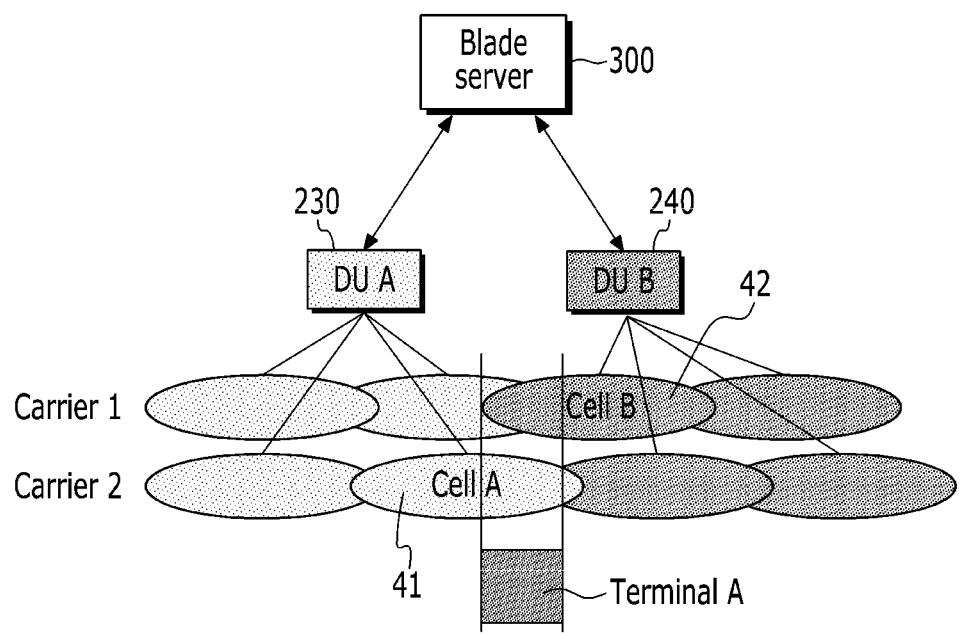
FIG. 6 is a view illustrating a communication environment where a DU provides CA among different boundary cells according to an exemplary embodiment of the present disclosure.

For example, as illustrated in FIG. 6, a cell A 41 and a cell B 42 are adjacent. However, the cell A 41 belongs to a DU A 230, and the cell B 42 belongs to a DU B 240. Namely, the cell A 41 and the cell B 42 are boundary cells belonging to different DUs and use different frequencies. Here, in the related art, even though the frequencies used by the cell A 41 and the cell B 42 are different, it is not possible to perform CA using frequencies of the cell A 41 and the cell B 42 because the cell A 41 and the cell B 42 belong to different DUs 230 and 240, respectively. However, according to an embodiment of the present disclosure, even though the cell A 41 and the cell B 42 are connected as different boundary cells to different DUs 230 and 240, respectively, CA may be performed using the frequencies of the cell A 41 and the cell B 42. That is, through CA between the cell A 41 connected to the DU A 230 and the cell B 42 connected to the DU B 240, a fast data service may be provided.

Meanwhile, in the above, only the two RUs 110 and 140 or the RUs 120 and 130 connected to the two DUs 210 and 220, respectively, have been described, but the embodiments of the present disclosure are not limited to the foregoing example. For example, by separately connecting the blade server 300 performing resource allocation to both of the two or more DUs, a CA function may also be provided to two or more RUs connected to the two or more DUs and using different frequencies.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. A mobile communication system using carrier aggregation, the mobile communication system comprising:
a plurality of base stations, each including i) a digital unit installed at a predetermined location, connected a core system, and configured to process a radio digital signal and ii) at least one radio unit physically separated from the digital unit, installed at a corresponding service area separated from the predetermined location, configured to convert and amplify digital signals received from the digital unit and transmit the same to a terminal, and configured to receive a signal transmitted from the terminal and transmit the received signal to the digital unit; and a blade server connected to at least two digital units respectively belongs to different base stations and configured to perform resource allocation on signals processed by the at least two connected digital units,
wherein a mobile communication service is provided to the terminal by using carrier aggregation between radio units respectively connected to the at least two connected digital units and using different frequencies.

2. The mobile communication system of claim 1, wherein:
the at least two digital units use protocols including radio resource control (RRC), a packet data convergence protocol (PDCP), and a physical (PHY); and
the blade server uses radio link control (RLC) and medium access control (MAC) protocols.

3. The mobile communication system of claim 2, wherein:
one of the at least two digital units operates as a primary component carrier (PCC) digital unit with respect to a particular user, and the PCC digital unit performs signal processing using the RRC, PDCP, and PHY protocols; and
the other operates as a secondary component carrier (SCC) digital unit with respect to the particular user, and the SCC digital unit performs signal processing using the PHY protocol.

4. The mobile communication system of claim 3, wherein:
when an uplink signal is received, the PCC digital unit and the SCC digital unit apply the PHY protocol and transmit the received PHY data to the blade server, respectively; and
signals processed by the blade server by using the MAC and RLC protocols are transmitted to the PCC digital unit, processed by using the PDCP and RRC protocols, and subsequently transmitted to the core system.

5. The mobile communication system of claim 3, wherein:
the PCC digital unit receives data transmitted from the core system, processes the received data by using the RRC and PDCP protocols, and subsequently transmits the processed signal to the blade server; and
resource allocation-processed signals by the blade server by using the MAC and RLC protocols are transmitted to the PCC digital unit and the SCC digital unit, respectively, according to frequencies.

6. A mobile communication system using carrier aggregation, the mobile communication system comprising:
a first base station including a first digital unit and a first radio unit, wherein the first digital unit is physically separated from the first radio unit, installed at a first predetermined location, connected to a core system, and configured to operate as a primary component carrier (PCC) with respect to a particular user;
a second base station including a second digital unit and a second radio unit, wherein the second digital unit is physically separated from the second radio unit, installed at a second predetermined location, connected to the core system, and configured to operate as a secondary component carrier (SCC) with respect to the particular user; and
a blade server connected to the first and second digital units and configured to perform resource allocation on signals processed by the first and second digital units,
wherein the first radio unit belongs to the first base station, installed at a first service area separated from the first predetermined location, connected to the first digital unit, configured to convert and amplify a digital signal received from the first digital unit and transmit the same to a terminal through a first frequency, and configured to receive a signal transmitted from the terminal through the first frequency and transmit the received signal to the first digital unit, wherein the second radio unit belongs to the second base station, installed at a second service area separated from the second predetermined location, connected to the second digital unit, configured to convert and amplify a digital signal received from the second digital unit and transmit the same to a terminal through a second frequency different from the first frequency, and configured to receive a signal transmitted from the terminal through the second frequency and transmit the received signal to the second digital unit, and wherein a mobile communication service is provided to the terminal by using carrier aggregation using the first and second frequencies between the first and second radio units respectively connected to the first and second digital units.

7. The mobile communication system of claim 6, wherein:
the first digital unit performs signal processing for the particular user by using protocols including a radio resource control (RRC), a packet data convergence protocol (PDCP), and a physical (PHY); and
the second digital unit performs signal processing for the particular user by using the PHY protocol.

8. The mobile communication system of claim 7, wherein the blade server performs resource allocation when processing a signal by using the RLC and MAC protocols.

9. A signal processing method for providing a mobile communication service with respect to a terminal by using carrier aggregation by a mobile communication system that includes a first digital unit of a first base station, which is connected to a core system and configured to operate as a primary component carrier (PCC) with respect to a particular user, a second digital unit of a second base station, which is connected to the core system and configured to operate as a secondary component carrier (SCC) with respect to the particular user, a blade server connected to the first and second digital units, a first radio unit of the first base station, which is installed at a remote location from the first digital unit, connected to the first digital unit through a predetermined link, and a second radio unit of the second base station, which is installed at a remote location from the second digital unit, connected to the second digital unit through a predetermined link, the signal processing method comprising:

receiving, by the first digital unit, data to be transmitted to a terminal of the particular user from the core system, and transmitting the received data to the blade server;

allocating, by the blade server, resources with respect to the first frequency and the second frequency by using the data;

transmitting, by the blade server, resource information allocated to the first frequency and the data to the first digital unit, and transmitting resource information allocated to the second frequency and the data to the second digital unit; and transmitting, by the first digital unit of the first base station and the second digital unit of the second base station, the data to terminal of the particular user by using the resource information transmitted from the blade server.

10. The signal processing method of claim 9, wherein, in the transmitting the received data to the blade server, the first digital unit performs signal processing on the data received from the core system by using protocols including the RRC and the PDCP, and transmits the same to the blade server.

11. The signal processing method of claim 10, wherein, in the allocating,
the blade server performs resource allocation corresponding to the first and second frequencies by using the RLC and MAC protocols with respect to the data transmitted from the first digital unit.

12. The signal processing method of claim 11, wherein, in the transmitting the data to the terminal of the particular user,
the first and second digital units perform signal processing on the data to be transmitted to the terminal of the particular user by using the PHY protocol thereof.

13. A signal processing method for providing a mobile communication system with respect to a terminal by using carrier aggregation by a mobile communication system that includes a first digital unit of a first base station, which is connected to a core system and configured to operate as a primary component carrier (PCC) with respect to a particular user, a second digital unit of a second base station, which is connected to the core system and configured to operate as a secondary component carrier (SCC) with respect to the particular user, a blade server connected to the first and second digital units, a first radio unit of the first base station, which is installed at a remote location from the first digital unit and connected to the first digital unit, and a second radio unit of the second base station, which is installed at a remote location from the second digital unit and connected to the second digital unit, the signal processing method comprising:

receiving, by the first radio unit of the first base station and the second radio unit of the second base station, signals from the terminal of the particular user, and transmitting the received signal to the blade server;

combining, by the blade server, the signals transmitted from the first radio unit of the first base station and the second radio unit of the second base station by using resource information allocated to the first and second frequencies, and transmitting the same to the first digital unit of the first base station; and performing, by the first digital unit of the first base station, signal processing for packet aggregation and radio resource controlling on data transmitted from the blade server, and transmitting the same to the core system.

14. The signal processing method of claim 13, wherein, in the transmitting the received signal to the blade server, the first and second digital units receive the signal transmitted from the terminal of the particular user as PHY data by using the PHY protocol thereof and transmit the PHY data to the blade server.

15. The signal processing method of claim 14, wherein, in the transmitting the same to the first digital unit,
the blade server combines the PHY data transmitted from the first and second digital units by using resource allocation information corresponding to the first and second frequencies and the RLC and MAC protocols and transmits the same to the first digital unit.

16. The signal processing method of claim 15, wherein, in the transmitting the same to the core system,
the first digital unit performs signal processing on the data received from the blade server by using protocols including the RRC and the PDCP and transmits the same to the core system.

* * * * *